US009586233B2

(12) United States Patent
Apte et al.

(10) Patent No.: US 9,586,233 B2
(45) Date of Patent: Mar. 7, 2017

(54) CAPACITIVE MICROMACHINED ULTRASOUND TRANSDUCERS WITH PRESSURIZED CAVITIES

(71) Applicant: The Board of Trustees of the Leland Stanford Junior University, Palo Alto, CA (US)

(72) Inventors: Nikhil Apte, Stanford, CA (US); Butrus T. Khuri-Yakub, Palo Alto, CA (US); Kwan Kyu Park, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 553 days.

(21) Appl. No.: 14/100,398

(22) Filed: Dec. 9, 2013

(65) Prior Publication Data

US 2014/0239770 A1 Aug. 28, 2014

Related U.S. Application Data

(60) Provisional application No. 61/768,050, filed on Feb. 22, 2013.

(51) Int. Cl.
*H02N 1/00* (2006.01)
*B06B 1/02* (2006.01)

(52) U.S. Cl.
CPC .................................. *B06B 1/0292* (2013.01)

(58) Field of Classification Search
CPC .... H02N 1/006; B06B 1/0292; B06B 2201/51
USPC ................. 310/300, 308–309; 381/174, 191; 73/718, 724, 514.32; 600/437, 459; 367/170, 181
See application file for complete search history.

(56) References Cited

U.S. PATENT DOCUMENTS

| | | | | |
|---|---|---|---|---|
| 8,455,963 | B1 | 6/2013 | Adler et al. | |
| 2005/0121734 | A1 | 6/2005 | Degertekin et al. | |
| 2006/0170014 | A1 | 8/2006 | Smith et al. | |
| 2008/0048211 | A1 * | 2/2008 | Khuri-Yakub ........ | B06B 1/0292 257/204 |
| 2010/0300208 | A1 * | 12/2010 | Fujii ...................... | G01H 11/06 73/724 |

* cited by examiner

*Primary Examiner* — Quyen Leung
*Assistant Examiner* — Eric Johnson
(74) *Attorney, Agent, or Firm* — Lumen Patent Firm

(57) ABSTRACT

A capacitive micromachined ultrasonic transducer (CMUT) is provided that includes a substrate, a bottom conductive layer disposed on a bottom surface of the substrate, a cavity disposed into a top surface of the substrate, a nonconductive layer disposed on the substrate top surface and on the cavity, a CMUT plate disposed on the nonconductive layer and across the cavity, a top conductive layer disposed on a top surface of the CMUT plate, a pressure control via that spans from the cavity to an ambient environment, and an active pressure controller connected to the pressure control via, wherein the active pressure controller is capable of actively varying a pressure differential across the CMUT plate.

5 Claims, 6 Drawing Sheets

100

*(a)*

*(b)*

*(a)*

*(b)*

CAPACITIVE MICROMACHINED ULTRASOUND TRANSDUCERS WITH PRESSURIZED CAVITIES

CROSS-REFERENCE TO RELATED APPLICATIONS

This application claims priority from U.S. Provisional Patent Application 61/768,050 filed Feb. 22, 2013, which is incorporated herein by reference.

FIELD OF THE INVENTION

The present invention relates generally to Capacitive Micromachined Ultrasound Transducers (CMUTs). More particularly, the invention relates to CMUTs with pressurized cavities for operating in environments with extreme pressure variations.

BACKGROUND OF THE INVENTION

Capacitive Micromachined Ultrasound Transducers (CMUTs) are increasingly being considered as a better alternative to traditional piezoelectric ultrasound transducers. In airborne applications, CMUTs offer the advantage of better impedance matching to the medium than piezoelectric transducers. One such application for CMUTs is in transit-time ultrasound flowmeters used for flare gas metering. Flare gas metering presents unique challenges due to the large variation in the flow velocities, gas pressures and gas composition. Ultrasound flowmeters are ideal for use in this application. However conventional CMUTs with vacuum backed plates cannot be used under widely varying ambient pressures. The pressure differential across the plate changes the static deflection of the plate, and as a result, the electric field through the gap. In a varying ambient pressure, the transmit and receive sensitivities and the operating frequency would vary considerably. Beyond a certain pressure, the CMUT plates would collapse onto the substrate and would drastically change their operating frequency.

In one attempt to address this problem, one group proposed operating CMUTs in a permanent contact mode even under 1 atm pressure. This would enable a more stable operating point over a wider operating pressure range. However, even such a CMUT would still be limited by the mechanical strength of the structure. Beyond a certain pressure, such a CMUT would fail mechanically.

What is needed is a CMUT that is capable of operating in environments ranging from relatively low pressure to several atmospheres of pressure.

SUMMARY OF THE INVENTION

To address the needs in the art, a capacitive micromachined ultrasonic transducer (CMUT) is provided that includes a substrate, a bottom conductive layer disposed on a bottom surface of the substrate, a cavity disposed into a top surface of the substrate, a nonconductive layer disposed on the substrate top surface and on the cavity, a CMUT plate disposed on the nonconductive layer and across the cavity, a top conductive layer disposed on a top surface of the CMUT plate, a pressure control via that spans from the cavity to an ambient environment, and an active pressure controller connected to the pressure control via, wherein the active pressure controller is capable of actively varying a pressure differential across the CMUT plate.

In one aspect of the invention, the CMUT plate is capable of operating at multiple resonance modes, where the resonance modes are a result of the interaction between the resonant mode of the plate and the acoustic resonance in the medium of the cavity and vias.

In a further aspect of the invention, the pressure control via spans from the cavity through the bottom conductive layer, or from the cavity through the CMUT plate.

According to another aspect of the invention, the active pressure controller is capable of controlling the signal gain of the CMUT, the signal bandwidth of the CMUT, or the signal gain and the signal bandwidth of the CMUT.

In another aspect of the invention, the signal gain and signal bandwidth of the CMUT are determined by parameters that include the size of the CMUT, the shape of the CMUT, the location of the pressure control vias and the number of the pressure control vias.

DETAILED DESCRIPTION

Figure 2:
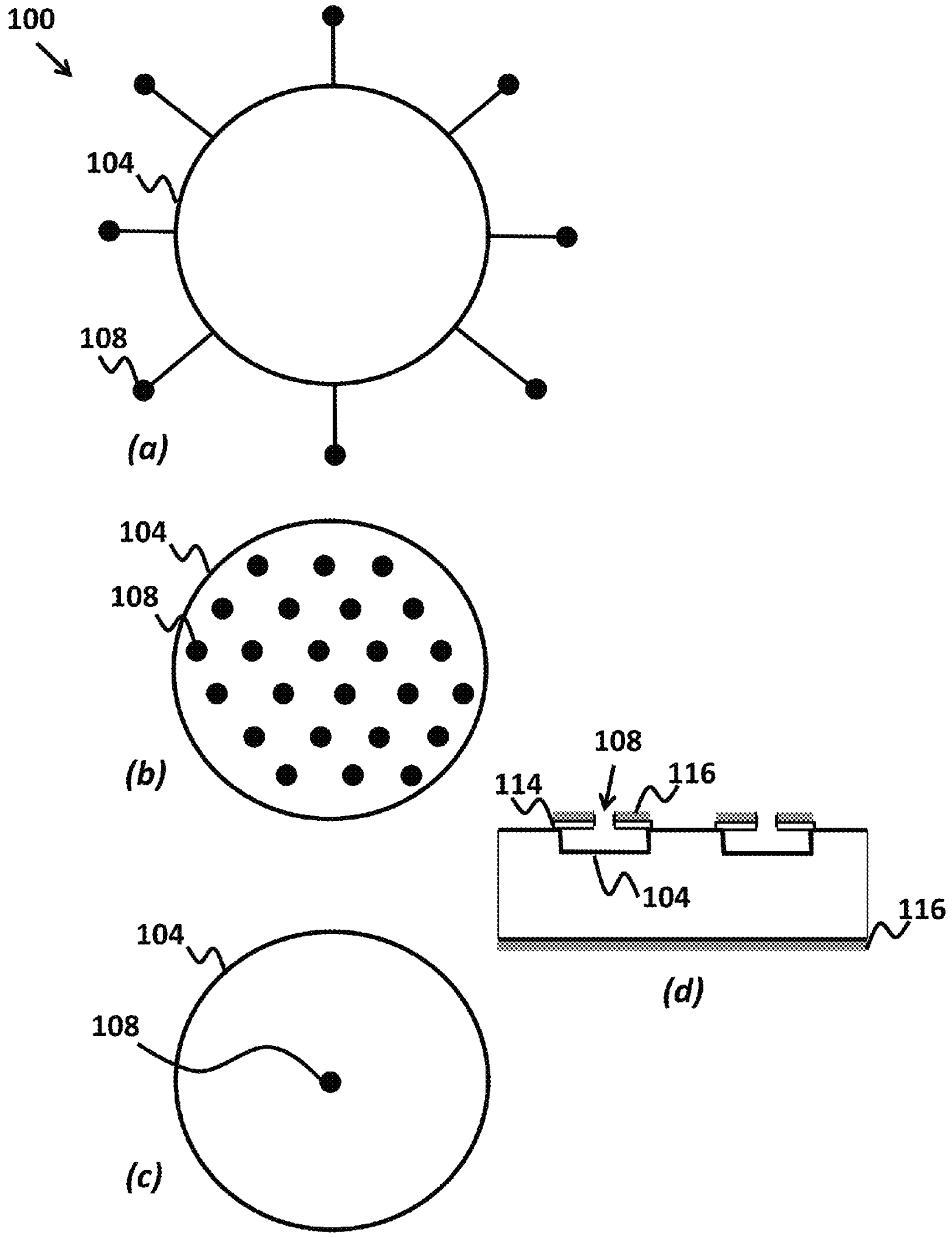
FIGS. 2*a*-2*d* show different arrangements of vias to vent CMUT cavity, according to embodiments of the invention.

The current invention includes venting the cavities of CMUTs for environments with extreme pressure variations. In one embodiment, the CMUT has zero differential pressure across the plate at any ambient pressure, thus ensuring a stable operating point and preventing mechanical failure. The venting vias are etched through the substrate or throughout the CMUT plate (see FIG. 2*d*). In one exemplary embodiment, two resonances are observed from the vented CMUTs—the mechanical resonance of the plate and an acoustic Helmholtz resonance associated with the cavity and the venting vias. Examples are provided of a variety of fabricated CMUTs having varied plate radii, thicknesses, gap heights and via arrangements to study these two resonances. In one example, a pair of CMUTs were characterized in a pitch-catch setup under varying ambient pressure. Here, the CMUTs were successfully able to transmit and receive ultrasound under an ambient pressure of up to 20 bar. As the pressure increases, the plate resonance dominated mode becomes weaker while the Helmholtz resonance dominated mode becomes stronger. The Helmholtz resonance dominated mode maintains its frequency and bandwidth under varying ambient pressure.

A CMUT cavity vented to the ambient environment ensures a zero differential pressure across the plate, and provides a stable operating point for the CMUT under varying ambient pressure. Also, with no pressure across the plate, such a CMUT is able to operate under any pressure condition with no risk of mechanical damage or failure.

Figure 1:
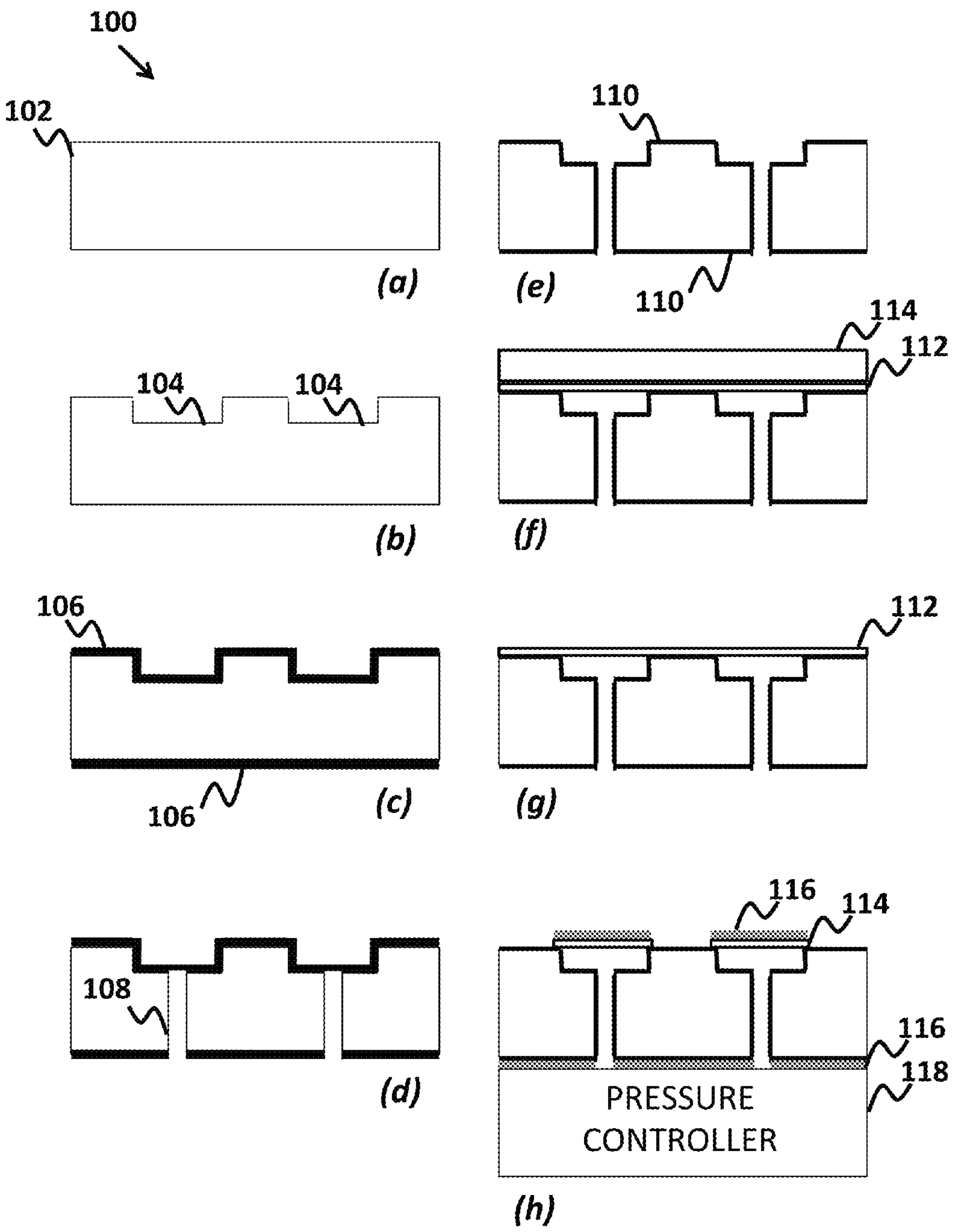
FIGS. 1*a*-1*h* show a fabrication process flow for CMUTs with vented cavities, according to one embodiment of the invention.

According to embodiments of the current invention, the CMUT cavity is vented by etching via holes through the CMUT plate or through the substrate. According to one embodiment, the fabrication process for the CMUT 100 starts with a low resistivity silicon wafer 102 (see FIG. 1*a*). The wafer 102 is patterned and cavities 104 are etched in the silicon 102 using wet TMAH (Tetra methyl Ammonium Hydroxide) (see FIG. 1*b*). The wet TMAH etch has good uniformity across the wafer and the etch depth can be controlled quite accurately after the etch rate is characterized for the setup. A thermal oxide layer 106 is applied to the top surface and bottom surface of the etched silicon wafer 102 (see FIG. 1*c*). The wafer is patterned on the backside and through-wafer vias 108 are etched from the back using deep reactive ion etching (DRIE) (see FIG. 1*d*). The oxide used as the masking layer is then stripped and 1.5-μm thick thermal oxide is grown again as an insulation layer 110 as well as for oxide posts for bonding (see FIG. 1*e*). A plate SOI wafer 112 is then bonded on top using direct fusion bonding (see FIG. 1*f*) and annealed in nitrogen at 1050° C. for 4 hours. The handle layer 114 and the buried oxide layer 110 of the plate SOI wafer are then etched away to release the CMUT plates 114 (see FIG. 1*g*). A 500-nm thick layer of aluminum 116 is evaporated on the front and back of the wafer to provide better electrical contact. The aluminum and plate silicon is then patterned to define each transducer unit (element), where the vias are also connected to a pressure controller 118 (see FIG. 1*h*).

The signal gain and signal bandwidth of the CMUT are determined by parameters that include the size of the CMUT, the shape of the CMUT, the location of the pressure control vias and the number of the pressure control vias.

In some exemplary embodiments, a variety of CMUTs were fabricated using this process by varying the plate thickness, plate radius and gap height. The dimensions of the vias were kept the same for ease of fabrication however the number of vias and the arrangement of these vias were varied as shown in FIGS. 2*a*-2*d*.

Figure 3:
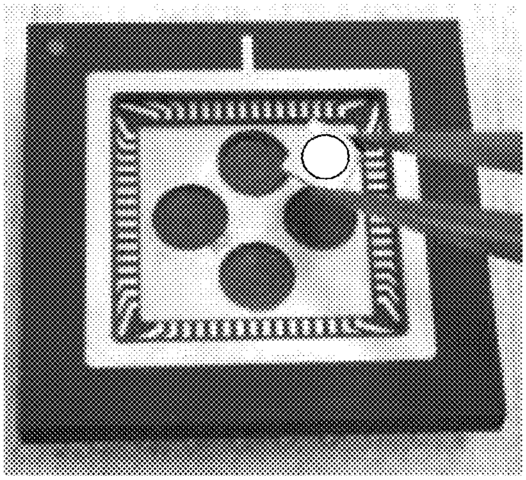
FIGS. 3*a*-3*b* show individual vented CMUT dies mounted on chip carriers with drilled recesses, according to one embodiment of the current invention.
Figure 3:
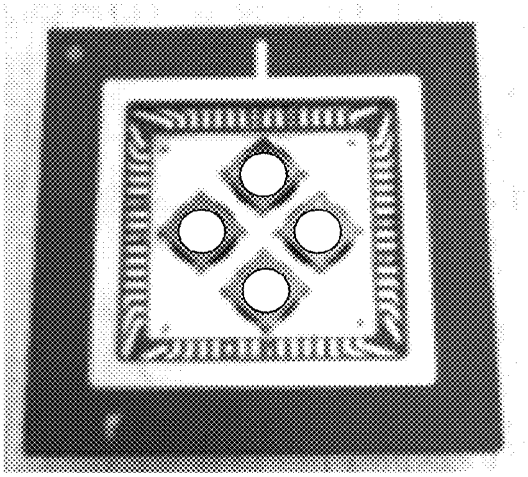

The fabricated CMUTs 100 were singulated by dicing, mounted on chip carriers and wirebonded (see FIGS. 3*a*-3*b*). Small recesses were drilled in the chip carriers so as to connect the via holes to ambient air. The CMUTs with vented cavities inherently have two resonances. The first resonance is dominated by the CMUT plate with its associated mass and stiffness, loaded by the air medium on top and backed by a squeeze film of the gas/fluid in the cavity. The second resonance is made up of the gas/fluid inside the via and CMUT cavity which form an acoustic Helmholtz resonator-like structure. The effective response of the CMUT is a result of the interaction between these two resonances.

Figure 4:
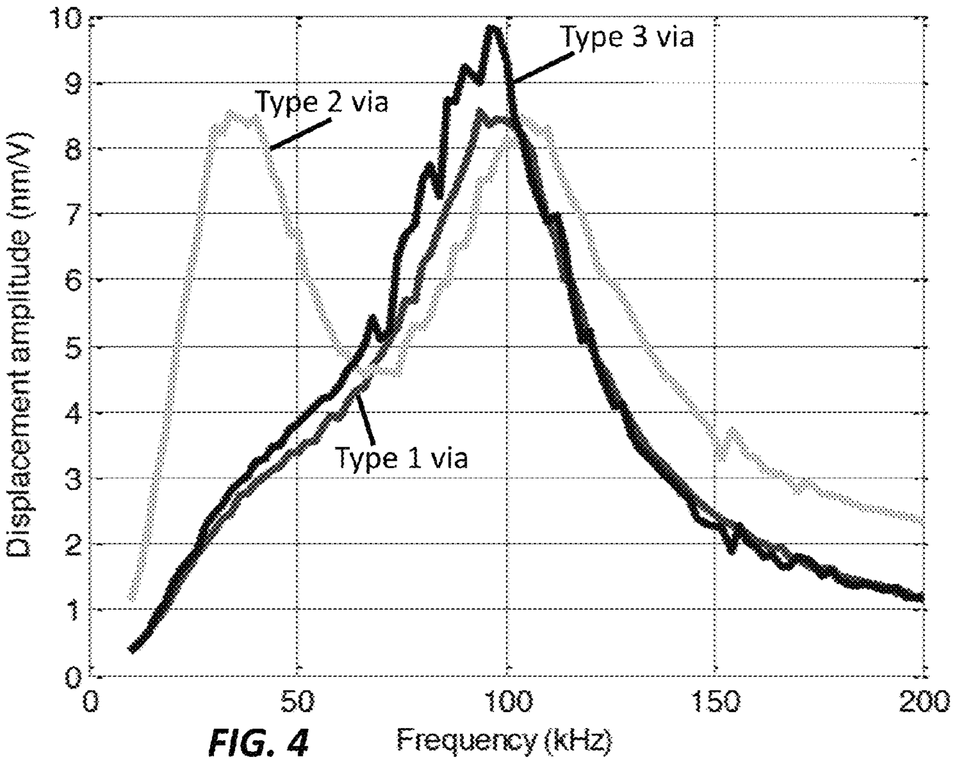
FIG. 4 shows a graph of two resonance modes by the CMUT, where the effect of via arrangement on CMUT's frequency response spectrum (Plate radius=750 μm, plate thickness=10 μm, gap height=11.2 μm, via radius=20 μm, via length=500 μm), according to one embodiment of the current invention.

In an exemplary embodiment, the CMUTs were initially characterized under 1 atm pressure. The CMUTs were biased with a DC voltage and excited with an AC voltage while sweeping the frequency. The displacement amplitude was measured under a laser Doppler vibrometer (LDV; OFV-511, Polytec GmbH, Waldbronn, Germany). As expected, the CMUTs exhibit two resonant modes (see FIG. 4). The plate dominated resonant mode is unaffected by the number of venting vias or their arrangement. However the Helmholtz resonance dominated mode is strongly dependent on the number of vias and becomes stronger as more vias are used. The frequency of the Helmholtz mode is independent of the number of vias or their arrangement.

Figure 5:
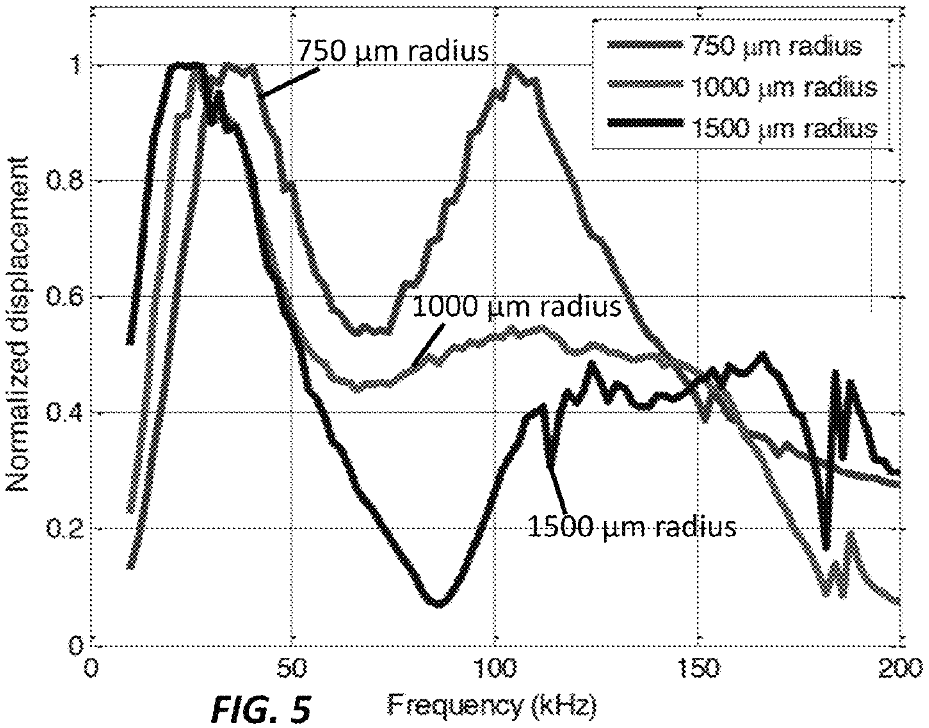
FIG. 5 shows as the plate radius is increased, the acoustic (Helmholtz) resonance dominated mode becomes stronger than the plate dominated mode, where the effect of plate radius on CMUT's frequency response spectrum (Plate thickness=10 μm, gap height=11.2 μm, via radius=20 μm, via length=500 μm, vias in type-2 arrangement), according to one embodiment of the invention.

Keeping all other parameters the same, as the plate radius is increased, the Helmholtz dominated mode becomes stronger than the plate dominated mode (see FIG. 5). Despite the decrease in the plate stiffness the frequency of the plate dominated mode increases slightly. This could be due to increased stiffness from the squeeze film.

Figure 6:
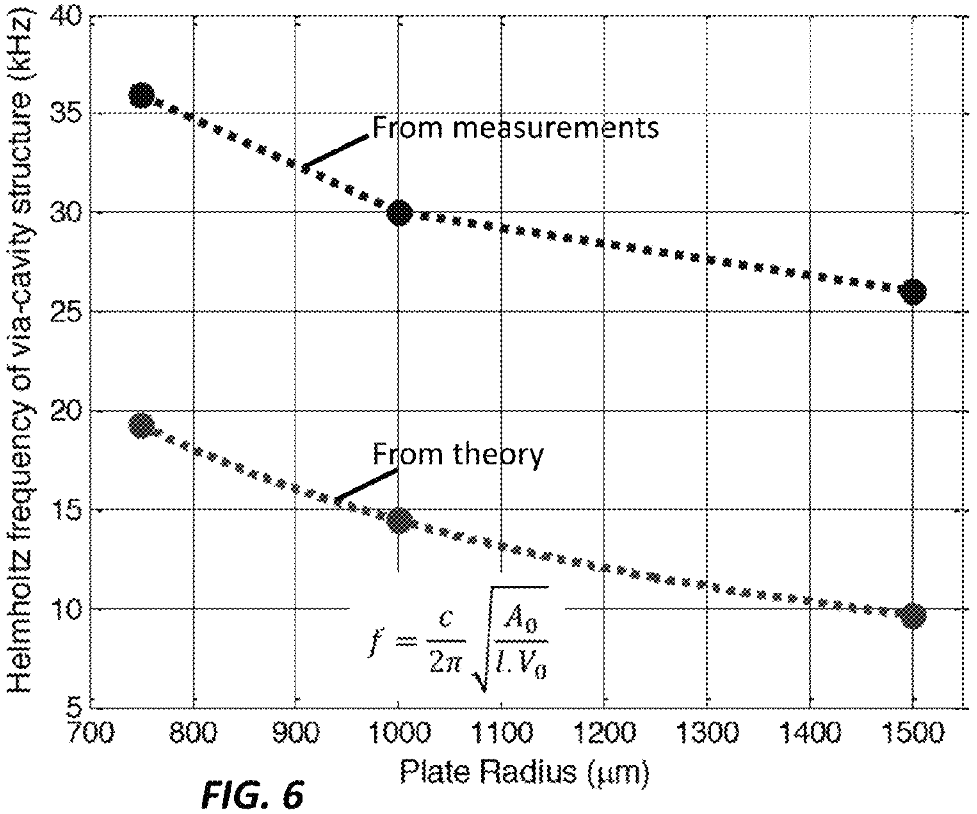
FIG. 6 shows the effect of plate radius on the acoustic (Helmholtz) resonance dominated mode frequency (Plate thickness=10 μm, gap height=11.2 μm, via radius=20 μm, via length=500 μm), according to one embodiment of the invention.

The frequency of the Helmholtz dominated mode decreases as the plate radius is increased. This trend conforms to the theoretical frequency [6] for a pure Helmholtz resonator of similar dimensions (see FIG. 6).

In another exemplary embodiment, a pair of identical devices was arranged in a pitch-catch setup in a pressure chamber at a distance of 7 cm from each other. Since these CMUTs have a relatively large bandwidth, the short circuit resonance frequency of the transmitting CMUT and the open circuit resonance frequency of the receiving CMUT need not be matched perfectly by adjusting the bias voltage.

Figure 7:
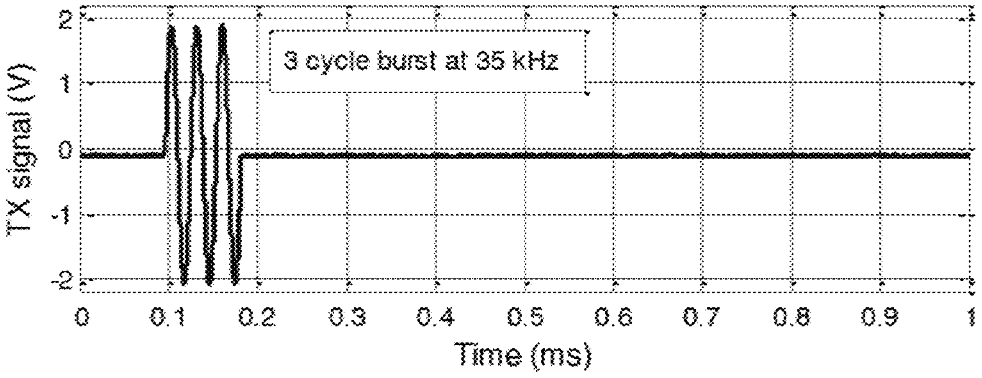
FIGS. 7*a*-7*b* show graphs of a pitch-catch signal (Plate radius=750 μm, plate thickness=20 μm, gap height=5.6 μm, via radius=20 μm, via length=500 μm, pressure=15 bar, DC bias=300 V), according to embodiments of the invention.
Figure 7:
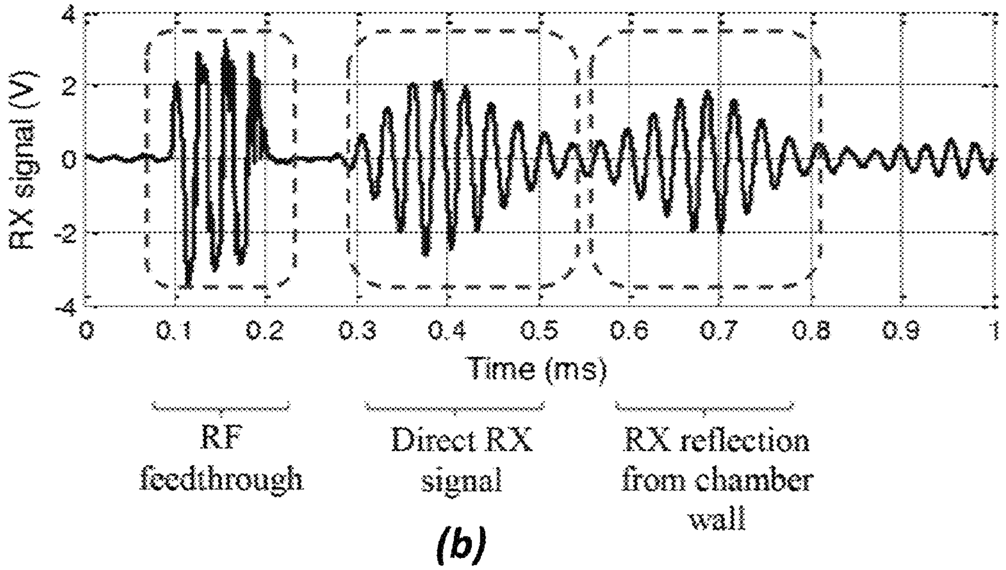

Ideally both the CMUTs can be biased closer to their collapse voltage to optimize the transmitting and receiving sensitivity. For this example, both the transmitting and receiving CMUT were biased at 300 V (~65% of collapse). The bias voltage was limited to protect the devices against any dielectric breakdown. The wider bandwidth of these CMUTs allows for a shorter transmit burst signal. In this case, the transmitting CMUT was excited by a 3 cycle AC burst and the signal from the receiving CMUT was recorded (see FIGS. 7*a*-7*b*). The frequency of the transmit burst signal was varied to get the frequency spectrum of the pitch-catch measurement.

The pressure in the chamber was varied from 1.01 bar (1 atm) up to 20 bar and the frequency spectrum of the pitch-catch signal was studied. At lower pressure the devices show a stronger signal at the plate dominated mode (at ~130 kHz for this design). However as the pressure is increased, the plate dominated mode loses strength. Also its frequency and bandwidth decrease. On the contrary the Helmholtz resonance dominated mode (at ~35 kHz for this design) becomes stronger with increasing pressure. Also, it maintains its frequency and bandwidth over the varying pressure.

Exemplary fabricated CMUTs are presented with cavities vented to the ambient atmosphere. Such CMUTs exhibit two peaks in their harmonic response, owing to the resonance of the plate and the acoustic Helmholtz resonance of the gas/fluid in the cavity and the venting via holes. The strength of the Helmholtz resonance peak strongly depends on the number of vias venting the CMUT cavity. The relative strength of the two modes also depends on the ambient pressure. With an increase in ambient pressure, the Helmholtz resonance mode becomes stronger while the plate resonance dominated mode weakens. Although its strength varies with the ambient pressure, the Helmholtz resonance mode maintains its frequency and bandwidth under varying pressure. This makes it quite attractive for use in transit-time flowmeters under varying pressure.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A capacitive micromachined ultrasonic transducer (CMUT), comprising:

a. a substrate;

b. a bottom conductive layer, wherein said bottom conductive layer is disposed on a bottom surface of said substrate;

c. a cavity, wherein said cavity is disposed into a top surface of said substrate;

d. a nonconductive layer, wherein said non-conductive layer is disposed on said substrate top surface and on said cavity;

e. a CMUT plate, wherein said CMUT plate is disposed on said nonconductive layer and across said cavity;

f. a top conductive layer, wherein said top conductive layer is disposed on a top surface of said CMUT plate;

g. a pressure control via, wherein said pressure control via spans from said cavity to a bottom surface of said bottom conductive layer; and h. an active pressure controller, wherein said active pressure controller is connected to said pressure control via, wherein said active pressure controller is capable of actively varying a pressure differential across said CMUT plate according to an ambient pressure, wherein said pressure differential is from 1.01 bar to 20 bar, wherein said CMUT is configured to form a mechanical resonance of said CMUT plate and an acoustic Helmholtz resonance with said cavity and said via, wherein said CMUT plate resonance is a dominant mode at said 1.01 bar ambient pressure, where said CMUT plate resonance becomes weaker while said Helmholtz resonance dominated mode becomes stronger as said active pressure controller increases to said 20 bar ambient pressure.

2. The CMUT of claim 1, wherein said CMUT plate is capable of operating at multiple resonance modes, wherein said resonance modes comprise an interaction between a resonant mode of said plate and an acoustic resonance in a medium in said cavity and vias.

3. The CMUT of claim 1, wherein said pressure control via spans from said cavity through said bottom conductive layer.

4. The CMUT of claim 1, wherein said active pressure controller is capable of controlling a signal gain of said CMUT, a signal bandwidth of said CMUT, or said signal gain and said signal bandwidth of said CMUT.

5. The CMUT of claim 1, wherein a signal gain and a signal bandwidth of said CMUT are determined by parameters selected from the group consisting of a size of said CMUT, a shape of said CMUT.

* * * * *